(12) United States Patent
Santos et al.

(10) Patent No.: US 10,112,636 B2
(45) Date of Patent: Oct. 30, 2018

(54) SHOPPING AID

(71) Applicant: cart mama LLC, Warwick, RI (US)

(72) Inventors: Kelly Jean Santos, Warwick, RI (US); Scott Richard Santos, Warwick, RI (US)

(73) Assignee: Cart Mama LLC, Warwick, RI (US)

(*) Notice: Subject to any disclaimer, the term of this patent is extended or adjusted under 35 U.S.C. 154(b) by 0 days.

(21) Appl. No.: 15/422,672

(22) Filed: Feb. 2, 2017

(65) Prior Publication Data

US 2017/0320512 A1 Nov. 9, 2017

Related U.S. Application Data

(60) Provisional application No. 62/333,163, filed on May 7, 2016.

(51) Int. Cl.
*B62B 3/14* (2006.01)

(52) U.S. Cl.
CPC .................. *B62B 3/1464* (2013.01)

(58) Field of Classification Search
CPC ........................................ B62B 3/14
USPC .................................. 224/411, 275
See application file for complete search history.

(56) References Cited

U.S. PATENT DOCUMENTS

| | | | |
|---|---|---|---|
| 1,656,339 A * | 1/1928 | Runyan | B60R 7/043 224/275 |
| 2,507,842 A * | 5/1950 | Waddill | B60R 7/043 224/547 |
| 3,014,759 A * | 12/1961 | Bing | B60R 7/043 224/275 |
| 4,512,504 A | 4/1985 | Owlett | |
| D306,520 S * | 3/1990 | McCarthy | D12/133 |
| 5,012,966 A * | 5/1991 | Turner | B62B 3/1472 206/556 |
| D383,283 S | 9/1997 | Hankins, III | |
| 5,961,018 A | 10/1999 | Abelbeck et al. | |
| 6,006,462 A * | 12/1999 | Lackomar | B60R 7/043 108/44 |
| 6,763,986 B2 * | 7/2004 | Santos | A45C 9/00 224/275 |
| D536,502 S | 2/2007 | Weigand et al. | |
| D536,503 S | 2/2007 | Weigand et al. | |
| 2003/0085246 A1 * | 5/2003 | Reisman | B60R 7/043 224/275 |
| 2005/0029760 A1 | 2/2005 | Lohman | |
| 2006/0283899 A1 * | 12/2006 | Hill | B60R 7/043 224/275 |
| 2007/0158377 A1 * | 7/2007 | Hassett | B60N 3/103 224/275 |
| 2009/0184146 A1 | 7/2009 | Diccianni | |
| 2010/0104223 A1 | 4/2010 | Hickey et al. | |
| 2012/0152992 A1 * | 6/2012 | Baas | B60R 7/005 224/275 |

\* cited by examiner

Primary Examiner — Brian D Nash
(74) Attorney, Agent, or Firm — Michael de Angeli

(57) ABSTRACT

A shopping aid adapted to be secured to the side of a shopping cart comprises rear and outer panels joined to one another to define a plurality of pockets for receiving goods. Straps fitted with D-rings, hooks, side-squeeze fasteners or the like secure the shopping aid to the shopping cart. The rear panel may have a stiffening member sewn into its upper edge; this may comprise a length of woven webbing, and may be integral with the straps. The upper edge of the outer panel may comprise an elastic member.

15 Claims, 1 Drawing Sheet

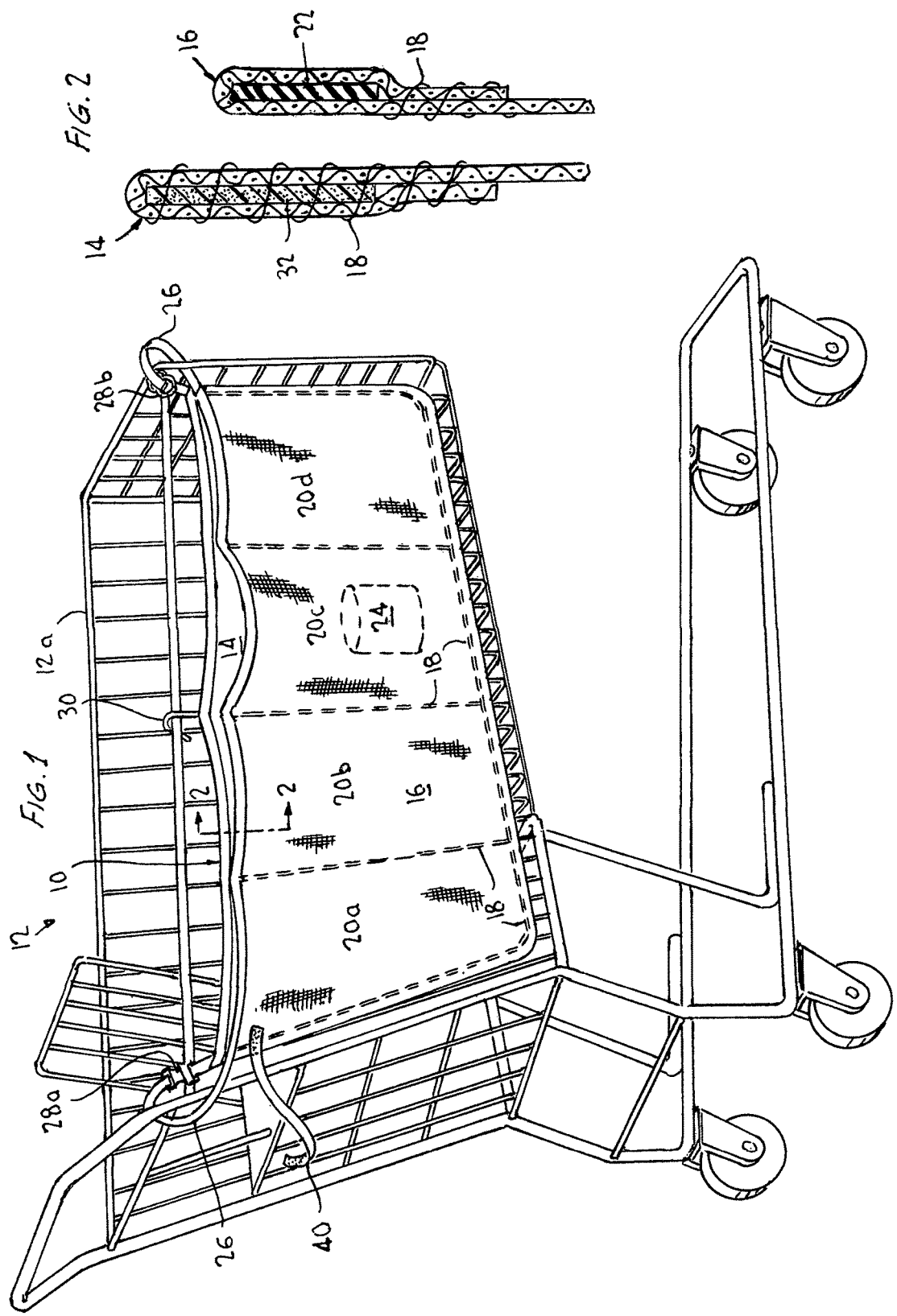

SHOPPING AID

CROSS-REFERENCE TO RELATED APPLICATION

This application claims priority from Provisional Application Ser. No. 62/333,163, filed May 7, 2016.

FIELD OF THE INVENTION

This invention relates to a shopping aid, more particularly an accessory bag adapted to be conveniently secured to the side of a conventional shopping cart to receive goods to be purchased. The shopping aid of the invention is particularly helpful when shopping with small children, when it is often necessary to place an infant in a carrier in the basket of the cart, making. It largely unavailable for receiving goods.

BACKGROUND OF THE INVENTION

As noted above, when shopping with children it is often desired to place a child carrier with an infant in it in the basket of a shopping cart, which makes it difficult to store all of the goods the parent wishes to purchase. The child carrier takes up a large fraction of the storage space in the basket, and one must take care to store any items that do fit in the basket around the child carrier such that they cannot topple into the child carrier.

It is therefore an object of the invention to provide an auxiliary storage device that can be conveniently attached to the side of a shopping cart to provide additional storage space for goods to be purchased. In addition to the requisite feature of convenient attachment, other desired attributes of such a device are durability in use; light weight and reasonable cost; and the ability to be rolled up or folded to a compact size for convenient storage when not in use.

The prior art known to the inventors does not satisfy the above objects of the invention.

Diccianni application 2009/0184146 shows a "shopping cart organizer" adapted to be attached to the handle of a shopping cart that is made by stitching a fabric member so as to define a number of pockets for glasses, keys, shopping list, pens and the like. This would not be suitable for receiving much in the way of goods.

Weigand et al design U.S. Pat. No. D536,503 shows a "product holder attachment for shopping cart" that appears to be a molded plastic box-like device. This would be bulky and inconvenient to store when not in use.

Weigand et al design U.S. Pat. No. D536,502 shows a "shopping cart product holder" that appears to be made primarily of bent wire. This would also be inconvenient to store when not in use.

Hankins, III shows a "basket to attach to side of shopping cart" apparently made of wire mesh. Likewise, this would be inconvenient to store when not in use.

Hickey et al application 2010/0104223 shows a "shopping bag" for receiving goods and having a number of pockets for the various items a shopper needs. This is apparently intended to be carried, not secured to a shopping cart.

Owlett U.S. Pat. No. 4,512,504 shows a "shopping organizer" adapted to be secured to the handle of a shopping cart and comprising various pockets, spring clips and the like for receiving items useful when shopping, not goods being purchased.

Abelbeck et al U.S. Pat. No. 5,961,018 shows a "tote bag" to be secured to the handle of a shopping cart and comprising various pockets for receiving items used by a shopper and also items useful to a child while accompanying an adult on a shopping trip.

Lohman application 2005/0029760 shows a "reusable shopping cart play and protective system for children" adapted to be secured to the fold-out child seat provided on many shopping carts. It can be made of cloth for convenient storage.

SUMMARY OF THE INVENTION

The shopping aid of the invention comprises a "saddlebag"—style bag designed to be temporarily and conveniently attached to the side of a shopping cart, by straps sewn to the fabric of the bag at either end thereof. The straps can be passed through apertures in the cart's walls, in the case of a shopping cart the body of which is molded of plastic, or around the wires of a cart made of bent and welded wire or tubing. The straps can be secured to the cart by hooks, shackles, carabiners, or hook and loop fasteners such as Velcro®; alternatively, paired straps may be provided and secured to one another, after passing one of the straps through an aperture in the cart, by D-rings or mating side-squeeze fasteners. The point at which the attachment devices are secured to the straps will preferably be adjustable, to suit carts of different sizes. A central attachment device, such as a hook on a strap, or mating straps of hook-and-loop material, may be provided, to be secured to the upper edge of the cart, to ensure that the bag does not sag excessively.

The bag itself preferably comprises a first rear panel of washable, durable fabric that in use is disposed against the wall of the shopping cart, and a second outer panel sewn to the first rear panel at least at the forward and rear ends thereof, and along their lower edges. Preferably, additional seams are provided so as to form a plurality of separate pockets, allowing the goods to be separated and better organized. One or more of the pockets may be insulated, for receiving goods that are best kept cold or hot. The fabric of the outer panel may be varied along its length; for example, it may be desirable to employ a mesh fabric for some of the pockets.

The structure of the rear and outer panels may differ in other ways. For example, to stiffen the upper edge of the rear panel it may be desirable to sew a length of webbing along the upper edge. By comparison, preferably a band of an elastic material may be sewn along the upper edge of the outer panel, so as to keep the pockets neatly closed, or nearly so, when goods are not being placed into or removed from the pockets.

The shopping aid of the invention can also be employed as a reusable bag, that is, to contain the goods after removal from the shopping cart.

BRIEF DESCRIPTION OF THE DRAWINGS

The invention will be better understood if reference is made to the accompanying drawings, in which:

FIG. 1 shows a perspective view of the shopping aid of the invention as attached to a shopping cart, with goods in one of the pockets shown in dot-dash lines; and FIG. 2 is a cross-section along line 2-2 of FIG. 1, illustrating the use of webbing in the rear panel and elastic band in the outer panel.

DESCRIPTION OF THE PREFERRED EMBODIMENT

As indicated above, FIG. 1 shows a perspective view of the shopping aid of the invention 10 as attached to the right side of a shopping cart 12. Of course, the shopping aid of the invention could be attached to the opposite side of shopping cart 12, or two of the shopping aids 10 could be employed simultaneously. The shopping cart as illustrated is of the type made up of metal tubing and wire, welded together; the invention is equally applicable for use with molded-plastic shopping carts.

As illustrated, the shopping aid 10 comprises a generally rectangular rear panel 14 and an outer panel 16 of approximately the same shape, both of durable and washable fabrics. For example, the acrylic fabric sold as Sunbrella is suitable. The outer panel 16 is secured to the rear panel 14 by stitching 18, denoted by paired dashed lines. More specifically, the outer panel is joined to the rear panel at forward, rearward, and lower peripheral edges, and along plural lines spaced between the forward and rearward peripheral edges, to define a plurality, four in the example, of pockets 20a-20d between the rear and outer panels. One or more small pockets can be provided, preferably at the rear top corner of the outer panel, to receive the shopper's keys, telephone, wallet, and the like.

The upper edge of the outer panel 16, and thus of each of pockets 20a-20d, includes an elastic member 22 (visible in FIG. 2). This allows the upper edge of the pockets 20a-20d to be drawn away from the rear panel 14 so that goods 24 can be inserted in the corresponding pocket.

The shopping aid of the invention 10 is secured to the shopping cart 12 by straps 26 at forward and rearward upper corners of the inner panel 14. Straps 26 may comprise webbing members joined to one another after passing through apertures in the structure of the shopping cart 12 by, for example, mating side-squeeze fasteners as shown at 28a, or straps with D-rings, as indicated at 28b. Side-squeeze fasteners 28a are well-known to the art, and are typically provided with integral adjusters for the working length of the straps 26, so that the shopping aid 10 can be conveniently and securely attached to a variety of differing shopping carts 12. Alternatively, straps 26 can be provided with hooks, shackles, carabiners, or hook-and-loop fasteners for securing the shopping aid of the invention to a shopping cart. A central hook 30, or a pair of straps comprising hook-and-loop materials, may be provided to secure the central portion of the shopping aid to the wall 12a of the shopping cart 12, preventing it from sagging. A strap 30 comprising mating sections of hook-and-loop materials may be sewn to one end of the shopping aid; this strap 30 can be used to neatly secure the shopping aid when rolled up for compact storage.

FIG. 2 is a cross-section along line 2-2 of FIG. 1, though the upper edge of the shopping aid of the invention 10, and shows a preferred construction thereof. As shown, the rear panel 14 is fabricated of a suitable fabric material, and its upper edge is finished by folding the edge of the fabric member back on the main plane of the rear panel and sewing through both, as indicated at 18. A stiffening member 32, such as a length of woven webbing, may be interposed between the folded-over upper edge and main plane of the rear panel to provide some stiffness to the upper edge of the rear panel, while retaining the ability to roll or fold the shopping aid of the invention. The straps 26 used to secure the shopping aid of the invention 10 to the cart 12 may be integral with stiffening member 32; where plural straps are required at forward and rearward corners of rear panel 14, as where D-rings or mating side-squeeze fasteners are used, one strap can be integral with stiffening member 32, and two additional straps will be required.

The outer panel 16 is similarly fabricated of a fabric material, which may differ from that of the rear panel 14. The materials of the rear and outer panels are chosen primarily for their durability in use and washability. The material of the outer panel 16 need not be homogenous; for example, one of more of the pockets 20a-20d may be of a mesh material, to allow air passage, or of an insulated material. As in the case of the rear panel 14, the upper edge of the outer panel 16 may be finished by folding the edge of the fabric member back on the main plane of the rear panel and sewing through both, as again indicated at 18. An elastic member 22 may be interposed between the folded-over upper edge and the body of the panel to provide elastic quality to the upper edge of the outer panel 16, so that the pockets can be conveniently opened and will secure goods therein.

Thus, in a typical grocery shopping trip with a small child and an infant, the shopper will dispose the older child in the fold-down seats commonly provided in shopping carts, and place the infant in a carrier in the basket of the cart. He or she will then attach the shopping aid of the invention to either or both sides of the cart, and proceed with shopping. When it is time to pay for the goods, the shopper can remove the goods from the pockets, have the goods scanned or otherwise valued, pay for them, and then replace the goods in the pockets. The shopper can then wheel the cart to his or her vehicle, and remove the goods from the pockets, or may simply detach the shopping aid with the goods still in the pockets, and place the entire assembly in the vehicle. When the shopper has reached his or her destination, the shopping aid can simply be carried in and unloaded. In this way, the shopping aid of the invention additionally acts as a reusable bag, in that no disposable plastic or paper bags need be employed. The shopping aid can then be rolled or folded for convenient storage.

While a preferred embodiment of the invention has been described, the invention is not to be limited thereto, but only by the following claims.

What is claimed is:

1. A shopping aid adapted to be conveniently attached to and removed from the side of a shopping cart, comprising:
    a rear panel, fabricated from a sheet of durable and washable fabric, said rear panel having an upper edge comprising a stiffening member fabricated of a length of woven webbing;
    an outer panel, fabricated from a sheet of durable and washable fabric;
    said outer panel being joined to said rear panel at forward, rearward, and lower peripheral edges, and along one or more lines spaced between said forward and rearward peripheral edges, defining a plurality of pockets between said rear and outer panels; and
    forward and rearward straps fixed to forward and rearward upper corners of at least said rear panel, said straps being adapted to be secured to the side of a shopping cart to support said shopping aid thereon.

2. The shopping aid of claim 1, wherein an upper edge of said outer panel comprises an elastic member.

3. The shopping aid of claim 1, wherein said straps are integral with said elongated stiffening member.

4. The shopping aid of claim 1, wherein said forward and rearward straps fixed to forward and rearward upper corners of at least said rear panel each comprise two straps, and are adapted to be secured to one another and to the side of a shopping cart by provision of side-squeeze fasteners.

5. The shopping aid of claim 1, wherein said forward and rearward straps fixed to forward and rearward upper corners of at least said rear panel each comprise two straps, and are adapted to be secured to one another and to the side of a shopping cart by provision of two D-shaped rings secured to a first strap, such that a second strap can be secured to said first strap by passing through said D-rings.

6. The shopping aid of claim 1, further comprising a further strap secured to at least the rear panel between forward and rearward corners thereof, and adapted to secure the upper edge of the rear panel to a wall of a shopping cart.

7. The shopping aid of claim 1, wherein said rear and outer panels are secured to one another by sewing.

8. The shopping aid of claim 1, further comprising a further strap, one end of said further strap being secured to the rear panel, and opposed ends of said further strap having mating fasteners secured thereto, so that said further strap can be employed to retain the shopping aid in a rolled-up configuration.

9. The shopping aid of claim 8, wherein said mating fasteners are hook and loop fasteners.

10. A shopping aid adapted to be conveniently attached to and removed from the side of a shopping cart, comprising:
   a rear panel, fabricated from a sheet of durable and washable fabric;
   an outer panel, fabricated from a sheet of durable and washable fabric;
   said outer panel being joined to said rear panel at forward, rearward, and lower peripheral edges, and along one or more lines spaced between said forward and rearward peripheral edges, defining a plurality of pockets between said rear and outer panels; and
   at least one pair of straps fixed to one of the forward and rearward upper corners of at least said rear panel, said straps being adapted to be secured to one another and to the side of a shopping cart to support said shopping aid thereon, and
   wherein said pair of straps are secured to one another and to the side of a shopping cart by provision of two D-shaped rings secured to a first strap of said pair, such that a second strap of said pair can be secured to said first strap by passing through said D-rings.

11. The shopping aid of claim 10, wherein said rear panel has an upper edge comprising a stiffening member fabricated of a length of woven webbing, and wherein one of said pair of straps is integral with said stiffening member.

12. A shopping aid adapted to be conveniently attached to and removed from the side of a shopping cart, comprising:
   a rear panel, fabricated from a sheet of durable and washable fabric;
   an outer panel, fabricated from a sheet of durable and washable fabric;
   said outer panel being joined to said rear panel at forward, rearward, and lower peripheral edges, and along one or more lines spaced between said forward and rearward peripheral edges, defining a plurality of pockets between said rear and outer panels; and
   at least one pair of straps fixed to one of the forward and rearward upper corners of at least said rear panel, said straps being adapted to be secured to one another and to the side of a shopping cart to support said shopping aid thereon, and
   wherein said rear panel has an upper edge comprising a stiffening member fabricated of a length of woven webbing.

13. The shopping aid of claim 12, wherein one of said pair of straps is integral with said stiffening member.

14. The shopping aid of claim 12, wherein said pair of straps are secured to one another and to the side of a shopping cart by provision of two D-shaped rings secured to a first strap of said pair, such that a second strap of said pair can be secured to said first strap by passing through said D-rings.

15. The shopping aid of claim 12, wherein said pair of straps are secured to one another and to the side of a shopping cart by mating side-squeeze fasteners.

* * * * *